Nov. 24, 1942.  W. McARTHUR  2,303,309
JOINT FITTING
Filed Oct. 31, 1941

INVENTOR.
Warren McArthur
BY
ATTORNEY.

Patented Nov. 24, 1942

2,303,309

UNITED STATES PATENT OFFICE 2,303,309

JOINT FITTING

Warren McArthur, New York, N. Y., assignor to Warren McArthur Corporation, a corporation of New York Application October 31, 1941, Serial No. 417,247

3 Claims. (Cl. 287—56)

This invention relates to a device for connecting together structural tubular members such, for example, as the different structural parts of metal furniture, or the like.

An object of the invention is to provide a fitting for the purpose specified, constructed and arranged to simplify and expedite the assembling operations in the manufacture of tubular metal furniture.

A further object is to provide a fitting of the type set forth having a simple, rugged construction which at the same time provides a joint having a pleasing appearance.

Figure 1:
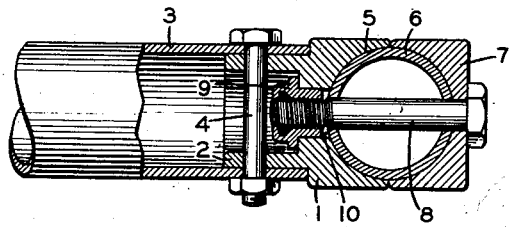
Figure 2:
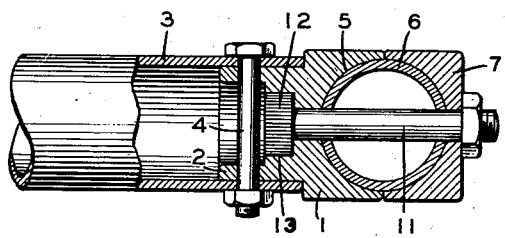
Figure 3:
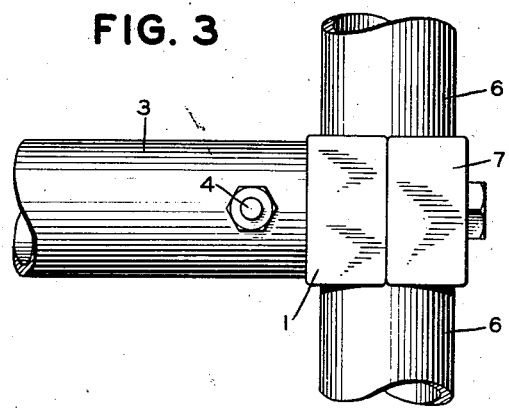

These and other objects which will be apparent to those skilled in the art are accomplished by this invention, selected embodiments of which are illustrated in the accompanying drawing in which, Fig. 1 is a transverse sectional view through a fitting illustrating one embodiment of the invention, Fig. 2 is a similar view of a modification, and Fig. 3 is an elevation showing the external appearance of a joint embodying the present invention.

As illustrated, the fitting of the present invention is especially adapted for use in connecting together structural members of light weight aluminum tubing in the manufacture of light weight furniture for airplanes, trains and the like. The drawing shows the fitting as employed in connecting a cross tube to the end of a second tube, but it will be apparent that the novel features of the invention are adapted to other specific uses.

As illustrated, the fitting comprises a body member 1 having a central opening and an annular boss 2 adapted to fit snugly within the open end of a tube 3 forming one of the structural members, to which the boss is secured by any suitable fastening means such as a bolt and nut 4. A groove or recess 5 in the outer face of the body member 1 receives a cross tube 6, forming the second structural member, and a recessed clamping block 7 fits around the outer side of the cross tube 6.

As illustrated in Fig. 1, the means for clamping the cross tube to the body member includes a clamping bolt 8 which extends through the outer block 7 and the cross tube 6 and is threaded to a nut 9 splined in an opening 10 in the body member 1 through which the bolt 8 extends. The nut is pressed into the recess before the body member is secured in the tube 3 and is firmly held therein. Preferably, the nut is of the lock type to prevent subsequent unthreading of the clamping bolt.

As illustrated in Fig. 2, the means for clamping the cross tube to the body member includes a clamping bolt 11 which extends through the outer block 7 and cross tube 8 and has its head 12 splined in a recess 13 in the body member. The bolt head is pressed into the recess before the body member is secured in the tube 3 and is firmly held therein.

The spline connection between the body member 1 and the nut 9, or bolt head 12 prevents any relative rotation therebetween during the clamping operation.

In most assemblies the tube 3 cannot be moved back, that is away from the tube 6, far enough to slip over the boss 2 if the fitting is first applied to the cross tube 6. Accordingly, assembly is made by first securing the body member 1 in the end of the tube 3. Then the cross tube 6 is positioned in the groove 5, and the block 7 and clamping bolt 8 are then applied to secure the tube 6 to the body member 1. The nut 9 engaging the opening 10 with a pressed fit and being splined therein, it is a simple operation to apply the bolt 8 and clamp the parts together.

In the form shown in Fig. 2, the bolt 11 is already in place in the body member when the latter is secured in the end of the tube 3. Hence the cross tube 6 is positioned in the groove 5 with the bolt 11 extending through the cross tube, after which the block 7 and clamping nut are applied to complete the assembly.

It will be apparent that the block 7 can be omitted if desired, but it will normally be found advantageous to use, particularly with aluminum tubing of light gauge because it tends to prevent the clamping pressure from crushing the tubing. At the same time, it adds to the appearance of the joint.

Obviously, the present invention can be variously modified and adapted within the scope of the appended claims.

I claim:

1. An article of manufacture comprising a fitting for connecting a cross tube to the end of a second tube, including a body member having a central opening, an annular boss on said body member extending into said second tube and having a recess therein, a clamping member held against rotation in the opening of said body member adjacent the recess in said boss, means extending through the walls of said boss and said second tube to secure said boss and tube together and to retain said clamping member in said opening, and means cooperating with said clamping member and engaging said cross tube to clamp said cross tube to said body member.

2. An article of manufacture comprising a fitting for connecting a cross tube to the end of a second tube, including a body member having a central opening and an annular boss on said body member extending into the end of said second tube and having a recess therein, a lock nut splined in the opening of said body member adjacent the recess in said boss, means extending through the walls of said boss and said second tube to secure said boss and tube together and to retain said nut in said opening, and a bolt cooperating with said nut and extending through said cross tube and said body member to clamp said tube to said body member.

3. An article of manufacture comprising a fitting for connecting a cross tube to the end of a second tube, including a body member having a central opening and an annular boss on said body member extending into the end of said second tube and having a recess therein, a cross tube clamping bolt extending through said body portion and said cross tube and having a head splined in the opening of said body member adjacent said recess, means extending through the walls of said boss and said second tube to secure said boss and tube together and to retain said bolt head in said opening, and means for securing said cross tube to said bolt.

WARREN McARTHUR.